US009042696B2

(12) United States Patent
Heck et al.

(10) Patent No.: US 9,042,696 B2
(45) Date of Patent: May 26, 2015

(54) METHOD AND STRUCTURE COMBINING VERTICAL AND ANGLED FACETS IN SILICON PHOTONIC WAVEGUIDES

(75) Inventors: John Heck, Berkeley, CA (US); Haisheng Rong, Pleasanton, CA (US)

(73) Assignee: Intel Corporation, Santa Clara, CA (US)

( * ) Notice: Subject to any disclaimer, the term of this patent is extended or adjusted under 35 U.S.C. 154(b) by 651 days.

(21) Appl. No.: 12/973,585

(22) Filed: Dec. 20, 2010

(65) Prior Publication Data
US 2012/0155820 A1    Jun. 21, 2012

(51) Int. Cl.
G02B 6/10 (2006.01)
G02B 6/42 (2006.01)
G02B 6/12 (2006.01)
G02B 6/132 (2006.01)

(52) U.S. Cl.
CPC .......... *G02B 6/4214* (2013.01); *G02B 6/12004* (2013.01); *G02B 6/132* (2013.01)

(58) Field of Classification Search
USPC ........................................................ 385/129
See application file for complete search history.

(56) References Cited

U.S. PATENT DOCUMENTS 7,599,277 B1 * 10/2009 Kato et al. ............... 369/112.27
2002/0088769 A1 * 7/2002 Antaki et al. ................... 216/59

OTHER PUBLICATIONS

John et al., "Vertical mirror in a silicon photonic circuit", U.S. Appl. No. 12/567,601, filed Sep. 25, 2009, 14 Pages.

* cited by examiner

*Primary Examiner* — Mike Stahl
*Assistant Examiner* — Hoang Tran
(74) *Attorney, Agent, or Firm* — Jordan IP Law, LLC

(57) ABSTRACT

Embodiments of the invention use crystallographic etching of SOI wafers with a (110)-oriented epi layer to form both the vertical input facet and the re-entrant mirror. Proposed layout design combined with proposed orientation of the epi enables both vertical facets and re-entrant (upward-reflecting) mirror facets to be made in a single wafer-level wet etch process.

15 Claims, 4 Drawing Sheets

METHOD AND STRUCTURE COMBINING VERTICAL AND ANGLED FACETS IN SILICON PHOTONIC WAVEGUIDES

FIELD OF THE INVENTION

Embodiments of the present invention are directed to photonic circuits and, more particularly, to combining vertical and angled facets in silicon photonic waveguides.

BACKGROUND INFORMATION

Silicon photonic circuits generally route optical signals in planar waveguides, and it is difficult to provide a path for light to enter/exit the circuits vertically. Routing light in or out of the wafer surface can be valuable for several reasons, such as coupling into a normal-incidence photodetector on the wafer surface, for wafer-level optical test/characterization, or other potential applications.

Of particular interest is the integration of planar silicon waveguides with Ge-based photodetectors. This is being addressed in several ways, all of which have various challenges. Planar photodetectors, in which the Ge is grown on top of the Si waveguide are quite large, because the optical coupling is inefficient and a long distance is needed for sufficient coupling of light to occur from the Si to the Ge.

To avoid this difficulty, trench sidewall photodetectors have been proposed, where the waveguide is terminated by a vertical facet. In this case, a facet with sufficient smoothness is difficult to form, and the epitaxial growth of the Ge-based photodetector can be very challenging.

Coupling light to and from planar silicon photonic devices, particularly in a low-cost, high volume manufacturing (HVM) compatible way, represents a significant challenge, and a major hurdle to commercialization. Currently, manual techniques are required to prepare facets on the edges of silicon photonics chips at the die level to couple light to and from the devices.

Currently, input facets are prepared manually by dicing and polishing at the die level. FIG. 1 shows a cross-sectional side view of a photonic waveguide including a Si handle wafer 100, a buried oxide layer 102, and an Si device layer 104. A re-entrant mirror (REM) 106 may be formed in the device layer 104 as similarly described in co-pending application Ser. No. 12/567,601, herein incorporated by reference. A device, such as a photodetector 108 may be over the re-entrant mirror 106. The coupling of light into and out of the silicon waveguide is done through facets 110 at the die edge that are prepared by dicing and mechanical polishing at die-level. This is a tedious manual process, which is not scalable to HVM. Grating couplers may also be used, but these have high loss for larger (>1 um) waveguide based devices and require a high-profile package, because they are inherently non-planar.

BRIEF DESCRIPTION OF THE DRAWINGS

The foregoing and a better understanding of the present invention may become apparent from the following detailed description of arrangements and example embodiments and the claims when read in connection with the accompanying drawings, all forming a part of the disclosure of this invention. While the foregoing and following written and illustrated disclosure focuses on disclosing arrangements and example embodiments of the invention, it should be clearly understood that the same is by way of illustration and example only and the invention is not limited thereto.

DETAILED DESCRIPTION

Described is a new way of creating vertical facets to enable light to be coupled edgewise into planar silicon photonic devices, using an HVM-compatible wafer-level crystallographic wet etch process. In addition, embodiments of the invention also describes how such facets may be combined with re-entrant mirrors (REMs) for out-of-plane reflection, which may be useful for SiGe based optical receiver modules, among other uses.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 2:
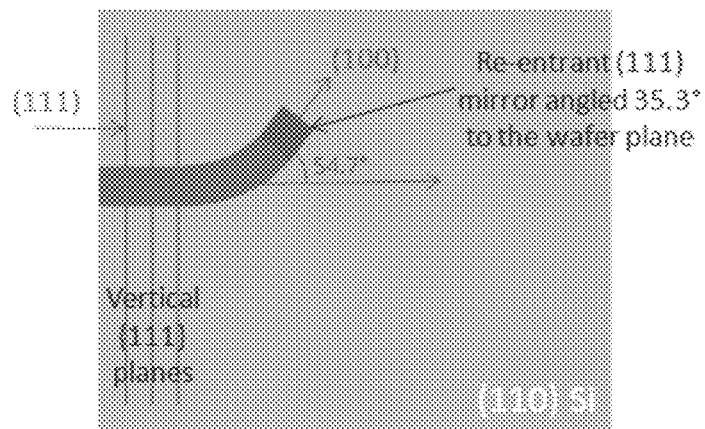
FIG. 2 is a top layout view of a silicon waveguide device with a bended waveguide according to one embodiment.

FIG. 2 shows a layout top view of the device according to one embodiment. As shown, a Si (110) wafer includes vertical planes (111). A re-entrant (111) mirror may be formed therewith. A waveguide bends approximately 54.7° into the (100) direction waveguide to bring the light from the (111) input facet such that it impinges correctly on the re-entrant (111) mirror angled approximately 35.3° to the wafer plane. This is explained in greater detail below.

Figure 3A:
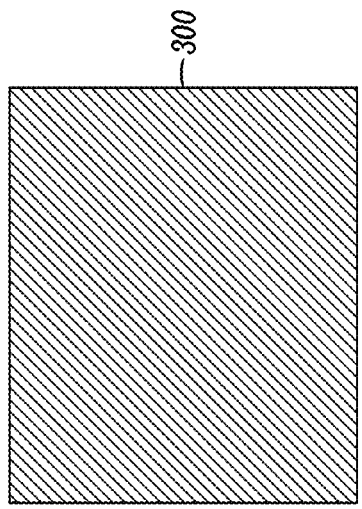
FIGS. 3A-3G comprise side-by-side side and top views of a wafer illustrating the fabrication steps for creating waveguide device having a re-entrant total internal reflection (TIR) mirror device with an input facet according to one embodiment of the invention.
Figure 3A:
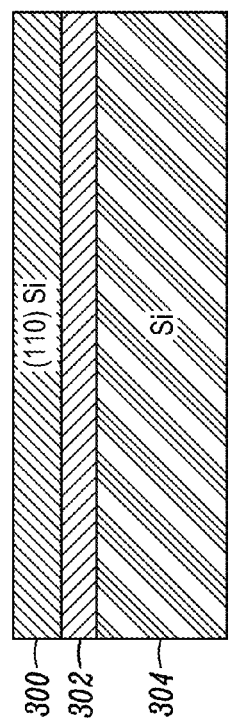

Referring to FIG. 3A, there is shown a top view and a side view of one embodiment of the inventive device in the first stages of fabrication. A silicon on insulator wafer comprises an epi Si device layer (110) 300, atop a buried oxide layer (BOX) 302 on a handle wafer 304.

Figure 3B:
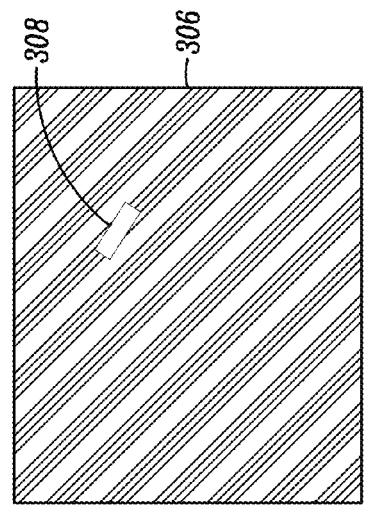
Figure 3B:
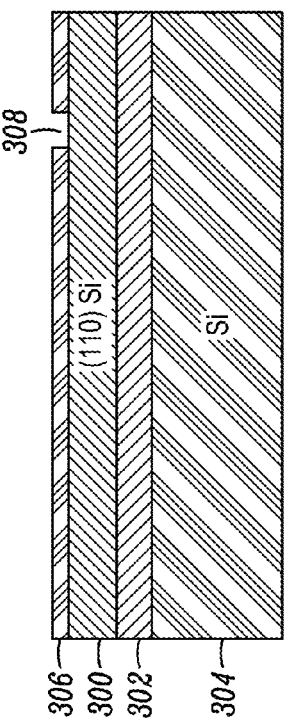
Figure 3C:
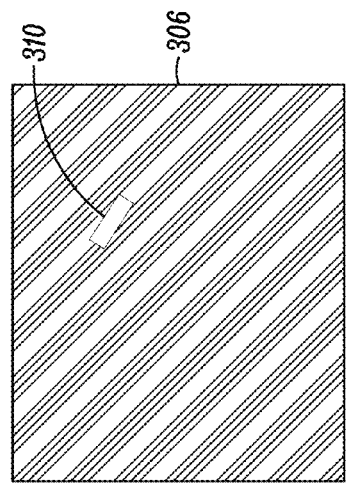
Figure 3C:
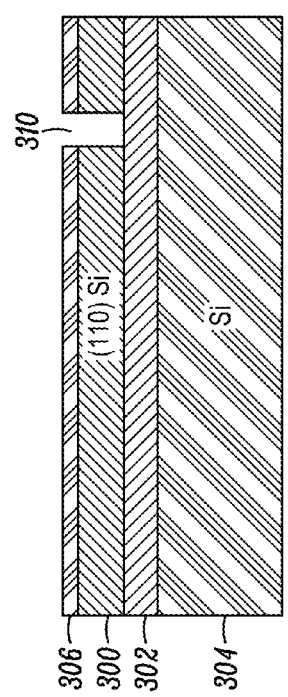
Figure 3D:
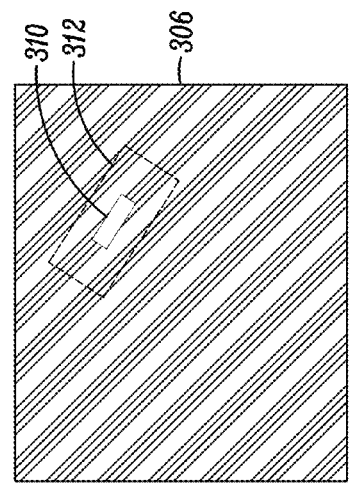
Figure 3D:
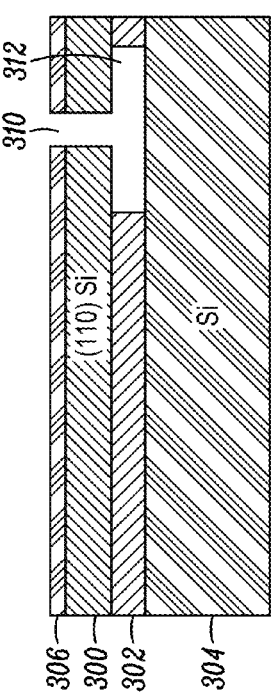

FIG. 3B shows the device wafer 300 having a nitride layer 306 patterned 308 on its surface. As shown in FIG. 3C, the Si wafer 300 may be etched down to the buried oxide (BOX) 302 to create a trench 310 using, for example a deep reactive ion etch (DRIE). In FIG. 3D, the oxide layer 302 may be etched, such as by, for example, a wet etch in hydrofluoric acid (HF) to create an undercut area 312 beneath the Si device layer 300.

Figure 3E:
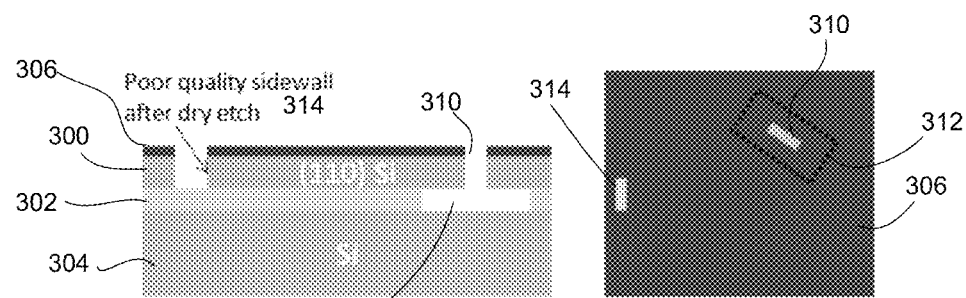

Referring now to FIG. 3E, a vertical input (or output) facet 314 may be formed by patterning in the nitride layer 306. Thereafter a dry etch may be used to etch down to the oxide layer 302. This dry etch may result in a rather poor quality sidewall, not yet suitable for use as an input facet.

Figure 3F:
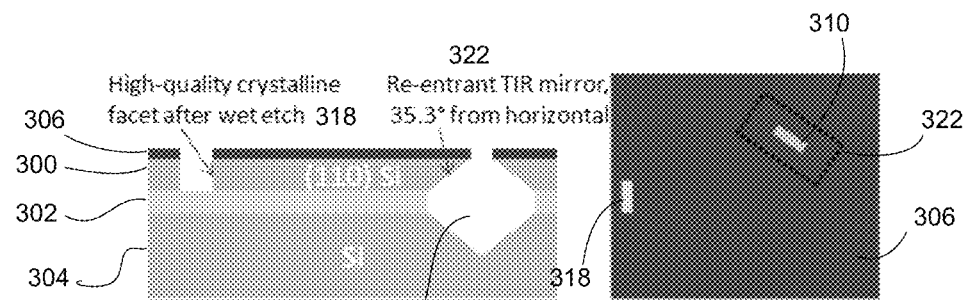

Referring to FIG. 3F the wafer 304 may be wet etched such as by being immersed in a crystallographic etchant such as potassium hydroxide (KOH). In some embodiments, ammonium hydroxide (NH4OH), ethylene diamene pyrocatechol (EDP) or tetramethyl ammonium hydroxide (TMAH) may be used. As shown, this wet etch creates a key hole cavity 320 in the Si waveguide layer 300 the BOX layer 302 and the handle wafer 304. Optionally, if the handle wafer 304 is prior heavily boron-doped (~1020 cm-3) by implantation, the handle wafer 304 may not be etched. As shown, this wet etch essentially polishes and creates a smooth surface vertical facet 318 suitable for the input/out of light and, in addition creates the re-entrant mirror (REM) 322 oriented at an angle approximately 35.3° to the horizontal wafer plane.

Figure 1:
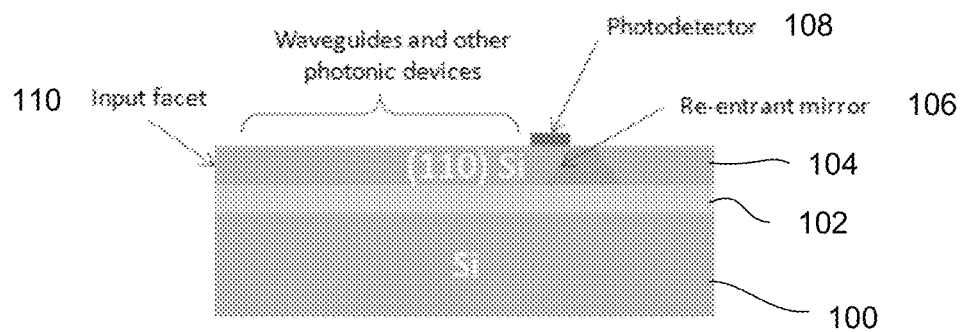
FIG. 1 is side view of a silicon photonic waveguide device having a diced and manually prepared input facet.
Figure 3G:
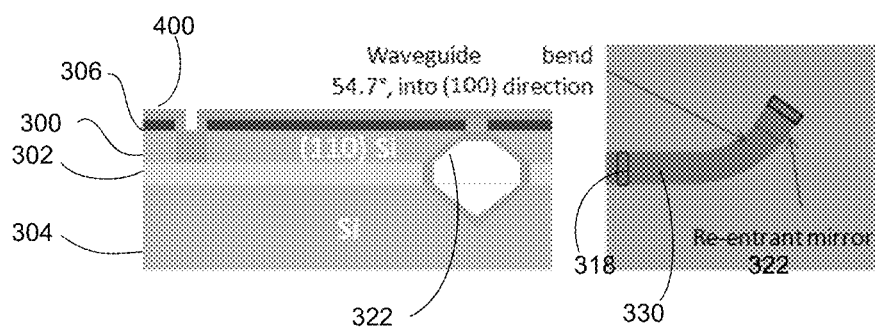

As shown in FIG. 3G, the nitride layer 306 may be optionally removed. The wafer 304 may be re-planarized by depositing and reflowing a thick oxide layer 400, for example, to seal the key hole 320 and then dry etched. Alternately a polymeric material may be used for replanarization. According to embodiments, the waveguide 330 in the Si layer 300 should bend at approximately 54.7°, into (100) direction between the input facet 318 and the re-entrant mirror 322. A photodetector (such as 108 shown in FIG. 1) may be formed on the surface of the wafer 300, positioned above the mirror 322. Such compact Ge photodetectors can be fabricated using standard surface processing.

In (110) silicon, two families of (111) planes are oriented vertically and 2 families of (111) planes are oriented at an angle of 35.3° to the wafer surface. By laying out the waveguide as shown in FIGS. 2 and 3G, one can combine the vertical input facet 318 with the re-entrant mirror facet 322. In addition, the 35.3° angle is sufficient for total internal reflection, so the mirror 322 is essentially lossless.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a waveguide formed on a silicon on insulator (SOI) wafer having a horizontal surface defining a wafer plane;
   an input/output facet at a first end of the waveguide, said input/output facet being vertically disposed with respect to the horizontal surface;
   a re-entrant mirror at a second end of the waveguide, said re-entrant mirror being angled at approximately 35.3° with respect to the horizontal surface;
   a bend in the waveguide from one crystal plane towards a second crystal plane, wherein the bend is along a path that is parallel to the wafer plane and wherein the bend in the waveguide bends in a direction towards a (100) crystal plane.

2. The apparatus as recited in claim 1 wherein the input/output facet and the re-entrant mirror are on (111) crystal planes.

3. The apparatus as recited in claim 1 wherein the horizontal surface is parallel to a (110) wafer plane.

4. The apparatus as recited in claim 2 wherein the bend in the waveguide is approximately 54.7° in a direction towards a (100) crystal plane.

5. The apparatus as recited in claim 1, further comprising a photodetector formed over the re-entrant mirror.

6. A method, comprising:
   providing a waveguide formed on a silicon on insulator (SOI) wafer, the top surface of the wafer having a (110) plane orientation and defining a horizontal surface;
   forming an input/output facet in a (111) vertical plane of the SOI wafer at a first end of the waveguide, wherein the input/output facet is vertical with respect to the horizontal surface;
   forming a re-entrant mirror in the (111) vertical plane of the SOI wafer at a second end of the waveguide and orienting the re-entrant mirror so that it forms an angle of approximately 35.3° with respect to the horizontal surface; and
   providing a bend in the waveguide towards the (100) plane direction wherein the bend is along a path that is parallel to the top surface of the wafer.

7. The method as recited in claim 6 wherein the bend is approximately 54.7°.

8. The method as recited in claim 6, further comprising wet etching the SOI wafer to form the re-entrant mirror and create a smooth surface for the input/output facet in a same processing step.

9. The method as recited in claim 8 wherein the processing step comprises immersing the SOI wafer in potassium hydroxide (KOH).

10. The method as recited in claim 8 wherein the processing step comprises immersing the SOI wafer in ammonium hydroxide (NH4OH).

11. The method as recited in claim 8 wherein the processing step comprises immersing the SOI wafer in ethylene diamine pyrocatechol (EDP).

12. The method as recited in claim 8 wherein the processing step comprises immersing the SOI wafer in tetramethyl ammonium hydroxide (TMAH).

13. The method as recited in claim 6 further comprising providing a photodetector over the re-entrant mirror.

14. A system, comprising:
   a waveguide formed on a silicon on insulator (SOI) wafer, the top surface of the wafer having a (110) plane orientation, wherein the top surface defines a horizontal surface;
   an input/output facet in a (111) vertical plane of the SOI wafer at a first end of the waveguide;
   a re-entrant mirror in the (111) vertical plane of the SOI wafer at a second end of the waveguide, wherein the re-entrant mirror is oriented approximately 35.3° with respect to the (110) plane;
   a bend in the waveguide towards the (100) plane direction wherein said bend is along a path that is parallel to the top surface of the wafer; and
   a photodetector over the re-entrant mirror.

15. The system as recited in claim 14 wherein the bend in the waveguide is approximately 54.7°.

* * * * *

UNITED STATES PATENT AND TRADEMARK OFFICE
CERTIFICATE OF CORRECTION

PATENT NO.        : 9,042,696 B2
APPLICATION NO.   : 12/973585
DATED             : May 26, 2015
INVENTOR(S)       : John Heck et al.

Page 1 of 1

It is certified that error appears in the above-identified patent and that said Letters Patent is hereby corrected as shown below:

In the Specification, column 1, in line 5, insert
-- STATEMENT REGARDING FEDERALLY SPONSORED RESEARCH AND DEVELOPMENT
This invention was made with Government support under H98230-08-3-0011 awarded by
Department of Defense. The Government has certain rights in this invention. --.

Signed and Sealed this
Sixth Day of October, 2015

Michelle K. Lee
*Director of the United States Patent and Trademark Office*